No. 849,646. PATENTED APR. 9, 1907.
H. C. WEAVER.
AGRICULTURAL IMPLEMENT.
APPLICATION FILED OCT. 23, 1906.

Witnesses
C. H. Walker
J. T. Walker

Inventor
Henry C. Weaver
By Shoemaker & Brown
Attorneys

UNITED STATES PATENT OFFICE.

HENRY C. WEAVER, OF ROYAL, ARKANSAS.

AGRICULTURAL IMPLEMENT.

No. 849,646.　　　　Specification of Letters Patent.　　　　Patented April 9, 1907.

Application filed October 23, 1906. Serial No. 340,165.

*To all whom it may concern:*

Be it known that I, HENRY C. WEAVER, a citizen of the United States, residing at Royal, in the county of Garland and State of Arkansas, have invented certain new and useful Improvements in Agricultural Implements, of which the following is a specification.

This invention relates to agricultural implements.

One object is to provide an implement for picking up stones, &c., from fields or roadways or potatoes or other vegetables from the soil and delivering them to a suitable receptacle carried by the implement.

Another object resides in the provision of a simple, inexpensive, durable, and efficient implement of the character stated.

With the above and other objects in view the present invention consists in the combination and arrangement of parts hereinafter referred to, shown in the accompanying drawings, and particularly pointed out in the appended claims, it being understood that changes may be made in the form, proportion, size, and minor details without departing from the spirit or sacrificing any of the advantages of the invention.

Figure 1:
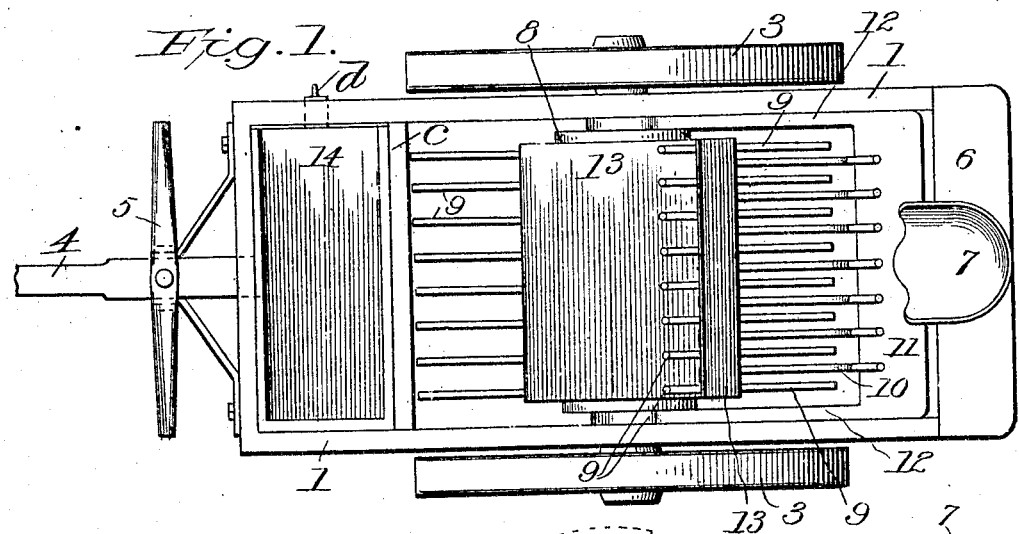
Figure 2:
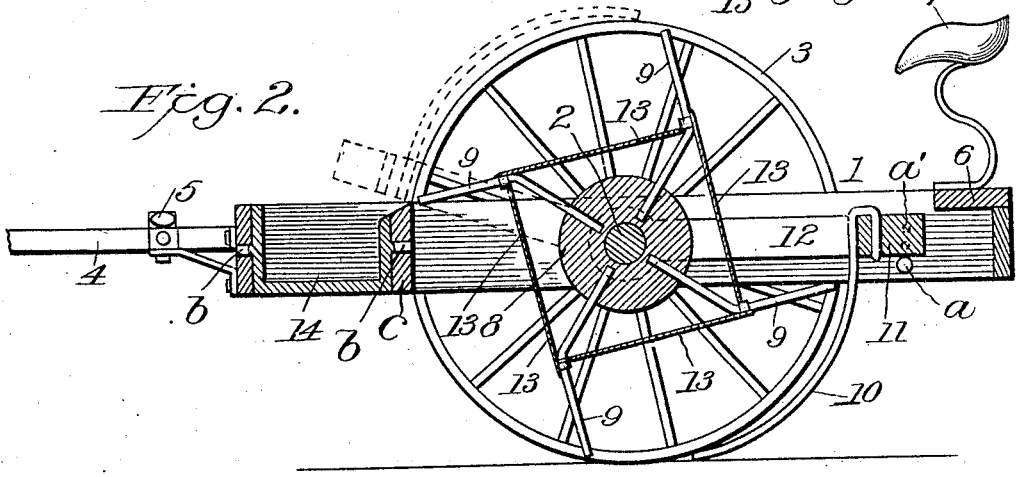
Figure 3:
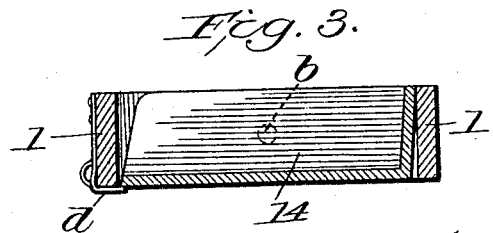

In the drawings, Figure 1 is a top plan view of my invention. Fig. 2 is a longitudinal sectional view, and Fig. 3 is a transverse sectional view of the receiving-receptacle.

Referring now more particularly to the accompanying drawings, the reference character 1 indicates a suitable frame pivotally mounted upon an axle 2 adjacent the inner faces of the wheels 3, there being a suitable shaft 4 secured to the frame and carrying a doubletree 5. A platform 6 is disposed at the rear of the frame, upon which the operator may stand, if desired. If preferred, a seat 7 may be disposed upon the platform 6.

Fixedly secured in any suitable manner upon the axle 2 is a drum 8, carrying separate series of alining tines 9, which are preferably curved and serve as fingers for coöperation with the scoop-rake made up of curved tines 10, mounted in any suitable manner in the head 11. This head 11 is secured at its ends to the arms 12, pivoted upon the respective ends of the axle 2. In its normal position the head 11 rests upon the supports *a* of the frame 1. This rake may have its head adjustably supported in any suitable manner, one means residing in disposing the supports *a* interchangeably in the perforations *a'*.

As the rock is taken up off the ground during movement of the implement the fingers or tines 9 by reason of their rotation with the drum push stone, rock, and the like upon the rake, finally causing the same to be pushed upwardly of the rake and dumped upon one of the series of platforms 13, from which they are delivered into a suitable collecting-receptacle 14, pivoted, as at *b*, between the front end of the frame 1 and the strip *c*.

The receptacle 14 is held against accidental tilting by the fastener *d* and has one open end to permit a ready discharge of the articles deposited therein when the fastener *d* is unlatched. It will be seen that there is a platform 13 between each two sets of curved tines or fingers 9, and each may be secured in any suitable manner to the tines or fingers 9.

When not operating the implement, the scoop-rake may be turned upon its pivot to dispose its head 11 forwardly of the ground-wheels 3, as shown in dotted lines in Fig. 2.

From the foregoing it will be understood that my implement may be drawn by draft and obviously by one or more animals. Of course the implement may be drawn by hand, if desired, and the free ends of the scoop-rake tines may be raised or lowered for different inclination with respect to the ground. In fact, it is one purpose of my invention to adapt it for the digging of potatoes and collecting them in the aforesaid collecting-receptacle 14. The scoop-rake may have its fingers or tines disposed for engagement with the surface of the soil or for digging thereinto, according to the disposition of the supports *a*.

In the use of my invention stones, rocks, &c., may be easily and expeditiously removed from roadways or fields and collected in a suitable receptacle. Potatoes and the like may not only be taken from the ground, but by reason of the passage through the implement relieved of more or less dirt and delivered to a collecting-receptacle carried by the implement.

What is claimed is—

1. An implement of the character described, comprising a wheeled frame, a drum mounted for rotation with the wheels, separate sets of tines carried by the drum, a platform arranged between each two sets of tines, and a scoop-rake having its head pivotally mounted upon the axis of the wheels.

2. An implement of the character described, comprising a wheeled frame, a drum mounted for rotation with the wheels, separate sets of tines carried by the drum, a platform arranged between each two sets of tines, a scoop-rake having its head pivotally mounted upon the axis of the wheels, and a collecting-receptacle arranged to coöperate with the scoop-rake and the separate sets of tines.

3. An implement of the character described, comprising a wheeled frame, a rotatable member arranged between the wheels and including separate sets of tines, and a scoop-rake including a head provided with means to pivotally mount it upon the axis of the wheels.

4. An implement of the character described, comprising a wheeled frame, a rotatable member arranged between the wheels and including separate sets of tines, a scoop-rake including a head provided with means to pivotally mount it upon the axis of the wheels, and means whereby said head may be supported in different positions within the frame.

5. An implement of the character described, comprising a wheeled frame, a rotatable member arranged within the frame and provided with separate sets of tines, a platform arranged between each two sets of tines, a scoop-rake pivotally mounted upon the axis of the wheels, means removably engaging the frame to adjust the position of the scoop-rake, and a collecting-receptacle arranged in advance of the wheels for coöperation with said rotatable member and the scoop-rake.

In testimony whereof I have signed my name to this specification in the presence of two subscribing witnesses.

HENRY C. WEAVER

Witnesses:
C. H. BROUGHTON,
GEORGE W. BRAY.